United States Patent
Dobrawa et al.

(10) Patent No.: US 7,442,751 B2
(45) Date of Patent: Oct. 28, 2008

(54) METHOD OF PRODUCING WATER-SOLUBLE NONTURBID COPOLYMERS OF AT LEAST ONE WATER-SOLUBLE N-VINYLLACTAM AND AT LEAST ONE HYDROPHOBIC COMONOMER

(75) Inventors: Rainer Dobrawa, Mannheim (DE); Ralf Widmaier, Mannheim (DE); Eberhard Schupp, Grünstadt (DE); Klaus Schnell, Neustadt (DE); Karl-Hermann Strube, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 11/644,681

(22) Filed: Dec. 22, 2006

(65) Prior Publication Data

US 2007/0149740 A1    Jun. 28, 2007

(30) Foreign Application Priority Data

Dec. 23, 2005    (DE) .................. 10 2005 062 679

(51) Int. Cl.
*C08F 26/10*    (2006.01)
*C08F 218/02*    (2006.01)

(52) U.S. Cl. ..................... 526/264; 526/68; 526/70; 526/212; 526/330

(58) Field of Classification Search .............. 526/68, 526/70, 212, 264, 330
See application file for complete search history.

(56) References Cited

U.S. PATENT DOCUMENTS

| | | | |
|---|---|---|---|
| 3,862,915 A | 1/1975 | Fried et al. | |
| 4,182,851 A | 1/1980 | Straub et al. | |
| 4,520,179 A | 5/1985 | Barabas et al. | |
| 4,554,311 A | 11/1985 | Barabas et al. | |
| 4,554,312 A * | 11/1985 | Barabas et al. | 524/808 |
| 5,122,582 A | 6/1992 | Potthoff-Karl et al. | |
| 5,319,041 A | 6/1994 | Zhong et al. | |
| 5,395,904 A | 3/1995 | Zhong et al. | |
| 5,502,136 A | 3/1996 | Zhong et al. | |
| 6,103,820 A | 8/2000 | Blankenburg et al. | |
| 6,369,180 B1 * | 4/2002 | Shih et al. | 526/264 |
| 6,512,066 B1 * | 1/2003 | Steinmetz et al. | 526/264 |

FOREIGN PATENT DOCUMENTS

| | | |
|---|---|---|
| DE | 2 218 935 | 10/1973 |
| EP | 0 000 161 | 1/1979 |
| EP | 0 418 721 | 3/1991 |
| EP | 0 795 567 | 9/1997 |

* cited by examiner

*Primary Examiner*—Helen L. Pezzuto
(74) *Attorney, Agent, or Firm*—Connolly Bove Lodge & Hutz LLP

(57) ABSTRACT

Method of producing vinyllactam copolymers by free-radical polymerization of at least one water-soluble N-vinyllactam and at least one hydrophobic comonomer in an organic solvent in the presence of an initiator under reflux conditions, where N-vinyllactam is added to the reflux.

11 Claims, No Drawings

METHOD OF PRODUCING WATER-SOLUBLE NONTURBID COPOLYMERS OF AT LEAST ONE WATER-SOLUBLE N-VINYLLACTAM AND AT LEAST ONE HYDROPHOBIC COMONOMER

BACKGROUND OF THE INVENTION

The present invention relates to a method of producing water-soluble copolymers of at least one water-soluble N-vinyllactam and at least one hydrophobic comonomer by free-radical polymerization of the monomers in an organic solvent, and to the copolymers obtainable by the method and their use.

The production of copolymers from N-vinyllactams and hydrophobic comonomers by free-radical polymerization is known. The production of such copolymers takes place in an organic solvent, for example an alcohol or in a mixture of water and organic solvent with a high content of solvent. Usually, the polymerization is carried out under reflux of the solvent. The hydrophobic monomers that are more readily volatile compared to the N-vinyllactams pass in this way into the gas phase and into the condensate.

For many application purposes, copolymers are desired which dissolve in water to give clear solutions, i.e. the FNU value of a 5% strength by weight solution should be <20. However, there is the problem that differing reactivities and differing polarity of the monomers can lead to increases in the concentration of the hydrophobic monomers which results in homopolymers which are not water-soluble being able to be formed from the hydrophobic monomers. Even in small amounts in the range from 500 to 1000 ppm, such homopolymers lead to turbidity of an aqueous solution of the copolymers. The increases in concentration of hydrophobic monomers can arise in particular in the gas phase and in the condensate, and also on the reactor wall and the surface of the polymerization medium.

U.S. Pat. No. 5,395,904 describes the polymerization of vinylpyrrolidone and vinylacetate by controlled polymerization according to the feed method. An alcoholic solvent is used which can comprise up to 50% by weight of water.

U.S. Pat. No. 5,319,041 describes the preparation of copolymers of vinylpyrrolidone and vinyl acetate by polymerization according to the feed method with control of the polymerization temperature.

U.S. Pat. No. 5,502,136 describes a method of producing copolymers of vinylpyrrolidone and vinyl acetate according to the feed method, where the feeds are controlled via a scheme defined by specific mathematical formulae.

U.S. Pat. No. 4,520,179 and U.S. Pat. No. 4,554,311 describe the polymerization of vinylpyrrolidone and vinyl acetate with t-butyl peroxypivalate as initiator in water or water/alcohol mixtures. The initiator used therein allows the production of copolymers with a narrow molecular weight distribution, that does not lead to water-soluble products with a FNU value of <20.

EP-A 161 describes a method of producing copolymers of vinylpyrrolidone and vinyl acetate where, after the polymerization, an after polymerization with specific initiators is carried out. However, the polymers have high residual contents of vinyl acetate and are not sufficiently nonturbid.

EP-A 795 567 describes the production of copolymers of vinyllactams and hydrophobic monomers by polymerization in aqueous solution.

EP-A discloses the production of copolymers of vinylpyrrolidone and vinyl esters which dissolve in water to give clear solutions, where, at a certain point during the polymerization, a solvent exchange is carried out in order to remove volatile constituents. This method is relatively complex.

DE-A 22 18 935 describes the copolymerization of N-vinylpyrrolidone with various water-soluble and water-insoluble comonomers. Use is made here of water-insoluble initiators which are used in the form of a finely divided suspension in an aqueous solution of the copolymers. However, in the case of the water-insoluble comonomers, this does not likewise lead to the desired water-soluble copolymers with a FNU value of <20.

SUMMARY OF THE INVENTION

The object of the present invention is therefore to provide an improved method of producing clearly water-soluble copolymers of at least one hydrophilic N-vinyllactam and at least one hydrophobic comonomer by free-radical copolymerization in an organic solvent.

According to the invention, the object is achieved by free-radical polymerization of at least one water-soluble N-vinyllactam and at least one hydrophobic comonomer in an organic solvent in the presence of an initiator under reflux conditions, wherein N-vinyllactam is added to the reflux.

DETAILED DESCRIPTION OF THE INVENTION

Suitable water-soluble vinyllactams are N-vinylpyrrolidone, 3-methyl-N-vinylpyrrolidone, 4-methyl-N-vinylpyrrolidone, 5-methyl-N-vinylpyrrolidone, N-vinylpyridone, N-vinylpiperidone, N-vinylcaprolactam, preferably N-vinylpyrrolidone. The vinyllactams are used in amounts of from 30 to 90% by weight, preferably 50 to 90% by weight.

The method according to the invention is suitable for producing water-soluble polymers of monomer mixtures whose content of hydrophobic monomers is in the range from 10 to 70% by weight, preferably 10 to 50% by weight, based on the monomer mixture. Suitable hydrophobic monomers are those with a solubility in water in the range from 1 to 100 g/l. Suitable hydrophobic monomers are, for example, vinyl acetate, vinyl propionate, methyl acrylate, ethyl acrylate, n-propyl acrylate, n-butyl acrylate, t-butyl acrylate, methyl methacrylate, ethyl methacrylate, acrylonitrile or methacrylonitrile. The hydrophobic monomers are in particular those whose boiling points at atmospheric pressure are in the range of the polymerization temperature from 60 to 130° C., so that they can evaporate under polymerization conditions. Even at a boiling point slightly below the polymerization temperature, the hydrophobic monomer can pass into the gas phase with the solvent if there is adequate miscibility with the solvent and the solvent boils. A preferred hydrophobic monomer is vinyl acetate.

Free-radical initiators which may be mentioned are, for example, dialkyl or diaryl peroxides, such as di-tert-amyl peroxide, dicumyl peroxide, bis(tert-butylperoxyisopropyl) benzene, 2,5-bis(tert-butylperoxy)-2,5-dimethylhexane, tert-butyl cumene peroxide, 2,5-bis(tert-butylperoxy)-2,5-dimethyl-3-hexene, 1,1-bis(tert-butylperoxy)-3,3,5-trimethylcyclohexane, 1,1-bis(tert-butylperoxy)cyclohexane, 2,2-bis(tert-butylperoxy)butane or di-tert-butyl peroxide, aliphatic and aromatic peroxy esters, such as cumyl peroxyneodecanoate, 2,4,4-trimethylpentyl 2-peroxyneodecanoate, tert-amyl peroxyneodecanoate, tert-butyl peroxyneodecanoate, tert-amyl peroxypivalate, tert-butyl peroxypivalate, tert-amyl peroxy-2-ethylhexanoate, tert-butyl peroxy-2-ethylhexanoate, tert-butyl peroxydiethylacetate, 1,4-bis(tert-butylperoxy)cyclohexane, tert-butyl peroxyisobutanoate, tert-butyl peroxy-3,5,5-trimethylhexanoate, tert-butyl peroxyacetate, tert-amyl peroxybenzoate or tert-butyl peroxybenzoate, dialkanoyl or dibenzoyl peroxides, such as diisobutanoyl peroxide, bis(3,5,5-trimethylhexanoyl) peroxide, dilauroyl peroxide, didecanoyl peroxide, 2,5-bis(2-ethylhexanoylperoxy)-2,5-dimethylhexane or dibenzoyl peroxide, and peroxycarbonates, such as bis(4-tert-butylcyclohexyl) peroxydicarbonate, bis(2-ethylhexyl) peroxydicarbonate, di-tert-butyl peroxydicarbonate, diacetyl peroxydicarbonate, dimyristyl peroxydicarbonate, tert-butyl peroxyisopropylcarbonate or tert-butyl peroxy-2-ethylhexylcarbonate. Readily oil-soluble azo initiators used are, for example, 2,2'-azobis(isobutyronitrile), 2,2'-azobis(2,4-dimethylvaleronitrile) or 4,4'-azobis(4-cyanopentanoic acid).

The free-radical initiator used is preferably a compound chosen from the group comprising tert-butyl peroxy-2-ethylhexanoate (Trigonox® 21; Trigonox® grades from Akzo Nobel), tert-amyl peroxy-2-ethylhexanoate (Trigonox® 121), tert-butyl peroxybenzoate (Trigonox® C), tert-amyl peroxybenzoate, tert-butyl peroxyacetate (Trigonox® F), tert-butyl peroxy-3,5,5-trimethylhexanoate (Trigonox® 42 S), tert-butyl peroxyisobutanoate, tert-butyl peroxydiethylacetate (Trigonox® 27), tert-butyl peroxypivalate (Trigonox® 25), tert-butyl peroxyisopropylcarbonate, (Trigonox® BPIC), 2,5-dimethyl-2,5-di(tert-butylperoxy)hexane (Trigonox® 101), di-tert-butyl peroxide (Trigonox® B), cumyl hydroperoxide (Trigonox® K) and tert-butyl peroxy-2-ethylhexylcarbonate (Trigonox® 117). It is of course also possible to use mixtures of the abovementioned oil-soluble free-radical initiators.

The amount of initiator used, based on the monomers, is in the range from 0.02 to 15 mol %, preferably 0.05 to 3 mol %. In the method according to the invention, the initiator is used as solution, depending on the solubility, in an organic solvent. Preferably, the same solvent as also serves as polymerization medium is chosen. The initiators are particularly preferably used in a C1-C4-alcohol. In these solutions the initiator concentration is in the range from 0.02 to 2 mol %, preferably 0.1 to 2 mol %, based on the solvent.

A suitable polymerization medium is a polar organic solvent. The solvent must be so hydrophilic that it is miscible with the vinyllactam in any mixing ratio which is achieved during the polymerization reaction. In addition, the solvent should boil under the polymerization conditions so that a reflux can form. Of suitability are, for example, aliphatic or aromatic halogenated hydrocarbons, such as chloroform, carbon tetrachloride, hexachloroethane, dichloroethane, tetrachloroethane, chlorobenzene, and liquid C1- or C2-chlorofluorohydrocarbons, aliphatic C2- to C5-nitriles, such as acetonitrile, propionitrile, butyronitrile or valeronitrile, linear or cyclic aliphatic C3- to C7-ketones, such as acetone, methyl ethyl ketone, methyl isobutyl ketone, 2- or 3-hexanone, 2-, 3-, or 4-heptanone, cyclopentanone, cyclohexanone, linear or cyclic aliphatic ethers, such as diisopropyl ether, 1,3- or 1,4-dioxane, tetrahydrofluran or ethylene glycol dimethyl ether, carbonates, such as diethyl carbonate, and lactones, such as butyrolactone, valerolactone or caprolactone. Suitable mono-, di- or polyhydric alcohols are, in particular, the C1- to C8-alcohols, the C2- to C8-alkanediols, and C3- to C10-tri- or polyols. Examples thereof are methanol, ethanol, n-propanol, isopropanol, n-butanol, sec-butanol, tert-butanol, n-pentanol, 2-pentanol, 3-pentanol, and ethylene glycol, propylene glycol or 1,3-propanediol.

The monoalkoxy alcohols used are, in particular, the abovementioned C1- to C8-alcohols and C2- to C8-alkanediols, and C3- to C10-triols substituted by a C1- to C6-alkoxy group. Examples thereof are methoxymethanol, 2-methoxyethanol, 2-methoxypropanol, 3-methoxypropanol, 2-methoxybutanol, 3-methoxybutanol, 4-methoxybutanol, 2-ethoxyethanol, 2-ethoxypropanol, 3-ethoxypropanol, 2-ethoxybutanol, 3-ethoxybutanol, 4-ethoxybutanol, 2-isopropoxyethanol, 2-isopropoxypropanol, 3-isopropoxypropanol, 2-isopropoxybutanol, 3-isopropoxybutanol, 4-isopropoxybutanol, 2-(n-propoxy)ethanol, 2-(n-propoxy)propanol, 3-(n-propoxy)propanol, 2-(n-propoxy)butanol, 3-(n-propoxy)butanol, 4-(n-propoxy)butanol, 2-(n-butoxy)ethanol, 2-(n-butoxy)propanol, 3-(n-butoxy)propanol, 2-(n-butoxy)butanol, 3-(n-butoxy)butanol, 4-(n-butoxy)butanol, 2-(sec-butoxy)ethanol, 2-(sec-butoxy)propanol, 3-(sec-butoxy)propanol, 2-(sec-butoxy)butanol, 3-(sec-butoxy)butanol, 4-(sec-butoxy)butanol, 2-(tert-butoxy)ethanol, 2-(tert-butoxy)propanol, 3-(tert-butoxy)propanol, 2-(tert-butoxy)butanol, 3-(tert-butoxy)butanol, 4-(tert-butoxy)butanol.

Of particular suitability is a C1- to C4-alcohol, preferably ethanol or isopropanol. Particular preference is given to using isopropanol as solvent.

The polymerization is usually carried out at a neutral pH in the range from 5 to 9. If necessary, the pH is adjusted and/or maintained by adding a base, such as ammonia, triethylamine, triethanolamine, NaOH, or an acid, such as hydrochloric acid, formic acid, acetic acid, lactic acid, oxalic acid.

If relatively low molecular weights are desired, these can be established by adding a regulator to the polymerization mixture. Suitable regulators are, for example, aldehydes, such as formaldehyde, acetaldehyde, propionaldehyde, n-butyraldehyde and isobutyraldehyde, formic acid, ammonium formate, hydroxylammonium sulfate and hydroxylammonium phosphate. In addition, regulators can be used which comprise sulfur in organically bonded form. These are, for example, di-n-butyl sulfide, di-n-octyl sulfide, diphenyl sulfide, diisopropyl disulfide, di-n-butyl disulfide, di-n-hexyl disulfide, diacetyl disulfide and di-t-butyl trisulfide. Preferably, the regulators comprise sulfur in the form of SH groups. Examples of such regulators are n-butyl mercaptan, n-hexyl mercaptan or n-dodecyl mercaptan. Particular preference is given to water-soluble, sulfur-containing polymerization regulators, such as, for example, hydrogen sulfites, disulfites and compounds such as ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, diethanol sulfide, thiodiglycol, ethylthioethanol, thiourea and dimethyl sulfoxide. Further suitable regulators are allyl compounds, such as allyl alcohol or allyl bromide, benzyl compounds, such as benzyl chloride or alkyl halides, such as chloroform or tetrachloromethane. In a preferred embodiment, the regulator is metered into the reaction mixture, if appropriate, as a solution in a C1-C4-alcohol.

In the method according to the invention, the monomers, if appropriate as solution in a C1-C4-alcohol, are metered into the reaction mixture (feed method). In one embodiment of the invention, up to 30% by weight, preferably up to 25% by weight, of the water-soluble N-vinyllactam I (based on the total amount of N-vinyllactam I) and a small amount of the initiator solution and solvent, preferably ethanol or isopropanol, are initially introduced. Then, the mixture is brought to the reaction temperature and the remaining amount of monomer is metered in continuously or in several portions at the same time as the remainder of initiator solution and, if appropriate, a regulator. In general, the metered addition takes place over a period of from 2 to 14 hours, preferably 3 to 12 hours, ideally 4 to 10 hours. Preferably, vinyllactam and hydrophobic comonomer are metered in so that the feeds are complete at the same time. The concentration of the monomers in the reaction mixture is in the range from 10 to 80% by weight, preferably 15 to 70% by weight, based on the reaction mixture. In this case, after the reaction mixture has been brought to the desired reaction temperature, the initiator solution is metered in continuously or in several portions, in particular over a period of from 2.5 to 16 hours, ideally 5 to 12 hours.

The polymerization reaction is carried out under reflux conditions. In this connection, reflux conditions means that the liquid polymerization mixture boils and the readily volatile components, such as the solvent and/or the hydrophobic monomers, evaporate and condense again as a result of cooling. Reflux conditions are maintained by controlling temperature and pressure.

The reaction temperature can be 60 to 150° C., it is usually in the range from 60 to 90° C. The reaction can be carried out at atmospheric pressure, under autogenous pressure or under protective-gas gage pressure. In the case of protective-gas gage pressure, the pressure is regulated so that boiling is still always present. The person skilled in the art can determine suitable pressure ranges using the relative vapor pressures. Usually, the pressure here will not exceed 2 MPa.

The polymerization takes place in a boiler equipped with a stirring device. Suitable stirring devices are anchor stirrers, propeller stirrers, cross-blade stirrers, Mik stirrers, and other types of stirrers suitable for solution polymerizations which are known to the person skilled in the art. In addition, one or more feed devices for metering the monomers, the initiator solution, and, if appropriate, the regulator (solutions) are also present.

In addition, the boiler, in the upper region of the reactor where no liquid polymerization mixture but a gas phase, is present, is equipped with a condenser.

Under the polymerization conditions, on account of their lower boiling points, solvents and hydrophobic monomers pass in part into the gas phase, whereas the higher-boiling N-vinyllactam remains in the liquid polymerization phase. In the condenser, the gaseous mixture of solvent and hydrophobic monomers condenses and thus forms the so-called reflux.

According to the method of the invention, vinyllactam is added to the reflux. The amount of vinyllactam is chosen here so that the amount of vinyllactam which is consumed per time unit through polymerization is partly or completely added to the reflux of hydrophobic monomer and in so doing is passed to the reaction mixture in the boiler. The amount of hydrophobic monomer consumed in each case per time unit is, by contrast, added directly to the reaction mixture. The amount of vinyllactam consumed per time unit can be calculated using the copolymerization parameters, or be determined by taking a sample during an experiment. The parameters relevant for this purpose are the copolymerization parameters of the monomers used, and also the equations required for the calculation, which are accessible to the person skilled in the art from known text books and publications. For the example of vinylpyrrolidone and vinyl acetate as comonomers, the relevant calculations have been detailed, for example, in U.S. Pat. No. 5,395,904. A separate calculation depending on the choice of monomers is easy to carry out by the person skilled in the art.

Accordingly, the method is carried out in a manner which involves adding some of the vinyllactam directly to the reaction mixture, if appropriate metering some directly into the reaction mixture, and adding some via the reflux of the hydrophobic monomer from the condenser. Some of the hydrophobic monomer is added directly to the reaction mixture, and some is metered in subsequently during the course of the reaction depending on consumption with some of the hydrophobic monomer always being in the gas phase and in the reflux until the end (complete conversion) of the polymerization.

Within the scope of the invention, it is likewise possible that the vinyllactam is only metered into the reflux of hydrophobic monomer or monomer and solvent toward the end of the reaction if the majority of monomers has taken place through normal metering directly to the reaction mixture, and the majority of vinyllactam has been consumed by polymerization. On account of the copolymerization parameters, at this point in time, the amount of vinyllactam is lower than that of hydrophobic monomer, meaning that polymer fractions would arise which comprise large proportions of hydrophobic monomer, or that homopolymers of hydrophobic monomer would form. This can be effectively prevented by the vinyllactam, which is usually metered directly into the reaction mixture subsequently, being metered in via the reflux in order, in so doing, to provide significantly more effective mixing with the reflux that is rich in hydrophobic monomer without this metered addition, and thus prevent high local concentrations of hydrophobic monomer in the reaction mixture at the position of the reflux into the reaction mixture and thus the described disadvantages.

The metering time of the vinyllactam to the reflux takes place at the start of the polymerization, with either some of the vinyllactam being added to the reaction mixture before or at the start of the reaction (addition of the initiator), and the remainder of vinyllactam to be metered being mixed into the reflux via a continuously controlled addition (linear or nonlinear course of the amounts of vinyllactam per time unit), before it flows back into the reaction mixture or is metered into this. In another embodiment of the invention, the reaction takes place as already revealed in the prior art via a controlled addition (linear or nonlinear course of the amounts of vinyllactam and/or hydrophobic monomer per time unit) of the monomers by reference to the metering scheme calculated on the basis of the copolymerization parameters. Finally, toward the end of the polymerization time (70 to 100% of the addition time of the hydrophobic monomer), the dosing of a further amount of vinyllactam takes place through metered addition to the reflux of the hydrophobic monomer. This further dosing of the vinyllactam, however, lasts longer by at least 10 to 40% of the total addition time of the hydrophobic monomer after the end of the addition of the hydrophobic monomer and is, if appropriate, also continued to the end if the reflux of the hydrophobic monomer becomes weaker and is barely still detectable.

In order to ascertain the suitable amounts, the reflux profile for the desired composition is firstly ascertained in each case. For this, the concentration of the vinyl ester in the reflux per time unit is determined for the entire course of the polymerization reaction.

fter the polymerization reaction, if desired, one or more polymerization initiators are additionally added and the polymer solution is heated, e.g. to the polymerization temperature or to temperatures above the polymerization temperature, in order to complete the polymerization. Of suitability are the azo initiators stated above, but also all other customary initiators suitable for a free-radical polymerization in alcoholic solution, for example peroxides, hydroperoxides, peroxodisulfates, percarbonates, peroxoesters and hydrogen peroxide. Through this, the polymerization reaction is conducted to a conversion of 99.9%. The solutions which form during the polymerization usually comprise 10 to 70% by weight, preferably 15 to 60% by weight, of polymer. After the polymerization, the solutions obtained can also be subjected to a physical after treatment, for example steam distillation or stripping with nitrogen, with the solvent or impurities volatile with steam being removed from the solution. In addition, a chemical after-treatment or bleaching, for example with hydrogen peroxide or sodium sulfite/tert-butyl hydroperoxide, can also take place.

The aqueous solutions of the copolymer obtained by steam distillation can, if appropriate, be converted into solid powders by a drying process corresponding to the prior art. Suitable drying processes are those which are suitable for drying from aqueous solution. Preferred processes are, for example, spray-drying, spray fluidized-bed drying, drum-drying and belt-drying. Freeze-drying and freeze-concentration can likewise be used.

The polymers obtained generally have a K value (determined at 25° C. in a 1% strength by weight aqueous or ethanolic solution) in the range from 10 to 100, in particular 15 to 90 and particularly preferably 20 to 80. Determination of the K value is described in H. Fikentscher "Systematik der Cellulosen auf Grund ihrer Viskosität in Lösung" [systematics of the celluloses based on their viscosity in solution], Cellulose-Chemie 13 (1932), 58-64 and 71-74, and Encyclopedia of Chemical Technology, Vol. 21, 2nd edition, 427-428 (1970).

A measure of their clear solubility is the nephelometric turbidity unit FNU (or NTU), which is measured at 25° C. in a 5% strength by weight aqueous solution of the polymer and is fixed by calibration with formazin as artificial opacifier. The precise method is given in the course of the examples below. The polymers obtained according to the invention have a FNU value of <20, in particular <10, preferably <7 and particularly <5.

The polymers obtained by the method according to the invention are used in particular in cosmetic and pharmaceutical preparations, for example as thickeners or film formers in hair lacquer additives, hair setting additives or hairspray additives, in skin cosmetic preparations, immunochemicals or as active ingredient-releasing agent in pharmaceutical preparations. In addition, the polymers produced according to the invention can be used as auxiliaries for agrochemistry, for example for seed coating or for slow-release fertilizer formulations. In addition, the polymers can also be used as coatings for industrial applications, such as coating of paper or plastics. The polymers are also suitable for use in hot-melt adhesives. Furthermore, these polymers are suitable as binders for transfer printing, as lubricant additives, as rust inhibitors or rust removers from metallic surfaces, as scale inhibitors or scale removers, as auxiliaries during the recovery of petroleum from oil-containing water, as auxiliaries during the production of petroleum and natural gas, and the transportation of petroleum and natural gas, as cleaners of waste-waters, as adhesive raw materials, as detergent additives, and as auxiliaries in the photo industry.

The examples listed below are intended to illustrate the invention without, however, limiting it.

EXAMPLES

The turbidity of the aqueous copolymer solution was determined by nephelometric turbidity measurement (modified method according to DIN 38404). In this method, the light scattered by the measurement solution is determined photometrically, light scattering being caused by the interaction between the light beams and the particles or droplets in the solution, the number and size of which constitute the degree of turbidity. The quantity being measured here is the nephelometric turbidity unit FNU (or NTU), which is measured at 25° C. in a 5% strength by weight aqueous solution of the polymer and is fixed by calibration with formazin as artificial opacifier. The higher the FNU value, the more turbid the solution.

General procedure:

| Feed material allocation | | Amount | Unit |
|---|---|---|---|
| Initial charge | of feed 1 | as stated | |
| | of feed 2 | 3.2 | g |
| | isopropanol | 30 | g |
| Feed 1 | isopropanol | 270 | g |
| | vinylpyrrolidone | as stated | |
| | vinyl acetate | as stated | |
| Feed 2 | isopropanol | 50 | g |
| | tert-butyl perpivalate 75% | 2 | g |
| Feed 3 | vinylpyrrolidone | as stated | |
| Feed 4 | isopropanol | 50 | g |
| | tert-butyl perpivalate 75% | 2 | g | tert-butyl perpivalate: 75% in mineral oil (Trigonox ® 25)

The polymerization was carried out in a stirred reactor with a volume of 2 l. The reactor was equipped with an ascending condenser which was provided in the lower section with an inlet valve for feed 3. The initial charge was flushed with nitrogen for 10 min and heated to the polymerization temperature (internal temperature). At the polymerization temperature minus 10%, feeds 1 and 2 were started.

Meter in feed 1 in a hours, feed 2 in b hours, return feed 3 in c hours mixed with the reflux to the reactor.

After-polymerize for 1 h. The system was then heated to an internal temperature of polymerization temperature plus 10% and feed 4 was metered in over d hours at this temperature. When feed 4 was complete, the mixture was after-polymerized for a further 2 h at this temperature. The majority of the solvent was then removed by distillation, and residual amounts were removed by means of steam distillation. During the steam distillation, water was added as required to maintain stirrability. After cooling, water was used, if appropriate, to establish the particular solids content.

Solids content in % by weight

K value measured 1% strength in ethanol

GC analysis: vinylpyrrolidone in ppm; vinyl acetate in ppm;

Appearance: color, clarity, FNU value

All experiments: residual monomers: vinyl acetate <10 ppm

The data in mol % referred to the total amount of the component in question.

Comparative Example

| VP/VAc = 55.5:44.5 | | mol | mol % |
|---|---|---|---|
| Initial charge: | VP | 0.142 | 8.470 |
| | VAc | 0.173 | 9.953 |
| Feed 1 | VP | 1.536 | 91.530 |
| | VAc | 1.563 | 90.047 |
| Feed 3 | VP | 0.000 | 0.000 | a=4 hours, b=6 hours, c=--, d=1.5 hours

Temperature: 70° C.

Appearance: yellowish, turbid, FNU: 106

Residual monomers: vinylpyrrolidone 36 ppm

Example 1

| VP/VAc = 55.5:44.5 | | mol | mol % |
|---|---|---|---|
| Initial charge: | VP | 0.142 | 8.470 |
| | VAc | 0.173 | 9.953 |
| Feed 1 | VP | 1.000 | 59.590 |
| | VAc | 1.563 | 90.047 |
| Feed 3 | VP | 0.536 | 31.940 | a=4 hours, b=6 hours, c=6,5, d=1.5 hours
Temperature: 70° C.
Appearance: slightly yellowish, clear, FNU: 7
Residual monomers: vinylpyrrolidone <10 ppm

Example 2

| at VP/VAc = 70:30 | | mol | mol % |
|---|---|---|---|
| Initial charge: | VP | 0.179 | 7.838 |
| | VAc | 0.116 | 9.050 |
| Feed 1 | VP | 1.401 | 61.281 |
| | VAc | 1.171 | 90.950 |
| Feed 3 | VP | 0.706 | 30.881 | a=4 hours, b=6 hours, c=6,5, d=1.5 hours
Temperature: 70° C.
Appearance: slightly yellowish, clear, FNU: 3
Residual monomers: vinylpyrrolidone <10 ppm

Example 3

| at VP/VAc = 30:70 | | mol | mol % |
|---|---|---|---|
| Initial charge: | VP | 0.077 | 7.806 |
| | VAc | 0.272 | 9.050 |
| Feed 1 | VP | 0.605 | 61.496 |
| | VAc | 2.732 | 90.950 |
| Feed 3 | VP | 0.302 | 30.697 | a=6 hours, b=9 hours, c=10, d=2.5 hours
Temperature: 70° C.
Appearance: slightly yellowish, clear, FNU: 11
Residual monomers: vinylpyrrolidone 15 ppm

Example 4

| at VP/VAc = 60:40 | | mol | mol % |
|---|---|---|---|
| Initial charge: | VP | 0.154 | 7.806 |
| | VAc | 0.155 | 9.050 |
| Feed 1 | VP | 1.209 | 61.446 |
| | VAc | 1.561 | 90.950 |
| Feed 3 | VP | 0.605 | 30.748 | a=4 hours, b=6 hours, c=6.5, d=1.5 hours
Temperature: 70° C.
Appearance: slightly yellowish, clear, FNU: 1.5
Residual monomers: vinylpyrrolidone <10 ppm

Example 5

| at VP/VAc = 50:50 | | mol | mol % |
|---|---|---|---|
| Initial charge: | VP | 0.128 | 7.809 |
| | VAc | 0.194 | 9.050 |
| Feed 1 | VP | 1.007 | 61.440 |
| | VAc | 1.951 | 90.950 |
| Feed 3 | VP | 0.504 | 30.751 | a=4.5 hours, b=7 hours, c=8, d=2 hours
Temperature: 70° C.
Appearance: slightly yellowish, clear, FNU: 3
Residual monomers: vinylpyrrolidone <10 ppm

What is claimed is:

1. A method of producing vinyllactam copolyrners, the method comprising:
   (a) providing at least one water-soluble N-vinyllactam and at least one hydrophobic comonomer; and
   (b) free-radical polymerizing the at least one water-soluble N-vinyllactam and the at least one hydrophobic comonomer at a temperature of 60 to 150° C. in an organic solvent in the presence of an initiator under reflux conditions such that a reflux comprising a condensing gaseous mixture of the organic solvent and the at least one hydrophobic comonomer is present, wherein at least a portion of the at least one water-soluble N-vinyllactam is added to the condensing gaseous mixture.

2. The method according to claim 1, wherein the hydrophobic comonomer comprises a monomer having a solubility in water of 1 to 100 g/l.

3. The method according to claim 1, wherein the hydrophobic comonomer comprises a monomer having a boiling point at atmospheric pressure of 60 to 150° C.

4. The method according to claim 2, wherein the hydrophobic comonomer comprises a monomer having a boiling point at atmospheric pressure of 60 to 150° C.

5. The method according to claim 1, wherein the hydrophobic comonomer comprises a monomer selected from the group consisting of vinyl acetate, vinyl propionate, methyl acrylate, ethyl acrylate, n-propyl acrylate, n-butyl acrylate, t-butyl acrylate, methyl methacrylate, ethyl methacrylate, acrylonitrile, methacrylonitrile, and mixtures thereof 6. The method according to claim 1, wherein the hydrophobic comonomer comprises a monomer selected from the group consisting of vinyl acetate, vinylpropionate, methyl acrylate, ethyl acrylate, n-propyl acrylate, n-butyl acrylate, t-butyl acrylate, methyl methacrylate, ethyl methacrylate, acrylonitrile, methacrylonitrile, and mixtures thereof 7. The method according to claim 1, wherein the hydrophobic comonomer comprises vinyl acetate.

8. The method according to claim 4, wherein the hydrophobic comonomer comprises vinyl acetate.

9. The method according to claim 1, wherein the N-vinyllactam comprises N-vinylpyrrolidone.

10. The method according to claim 8, wherein the N-vinyllactam comprises N-vinylpynolidone.

11. The method according to claim 1, wherein the organic solvent comprises an alcohol.

* * * * *